US009258571B2

(12) United States Patent
Seregin et al.

(10) Patent No.: US 9,258,571 B2
(45) Date of Patent: *Feb. 9, 2016

(54) METHOD AND APPARATUS FOR CODING VIDEO AND METHOD AND APPARATUS FOR DECODING VIDEO ACCOMPANIED WITH ARITHMETIC CODING

(71) Applicant: SAMSUNG ELECTRONICS CO., LTD., Suwon-si (KR)

(72) Inventors: Vadim Seregin, Suwon-si (KR); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,218

(22) Filed: Jan. 22, 2015

(65) Prior Publication Data

US 2015/0139332 A1 May 21, 2015

Related U.S. Application Data

(63) Continuation of application No. 14/130,052, filed as application No. PCT/KR2012/005087 on Jun. 27, 2012.

(60) Provisional application No. 61/502,038, filed on Jun. 28, 2011.

(51) Int. Cl.
*H04N 19/13* (2014.01)
*H04N 19/60* (2014.01)
(Continued)

(52) U.S. Cl.
CPC ............. *H04N 19/593* (2014.11); *H04N 19/13* (2014.11); *H04N 19/157* (2014.11);
(Continued)

(58) Field of Classification Search
CPC ....... H04N 19/60; H04N 19/44; H04N 19/13; H04N 19/157; H04N 19/176; H04N 19/593; H04N 19/1883; H04N 19/91
USPC ........................... 375/240.02, 240.03, 240.18
See application file for complete search history.

(56) References Cited

U.S. PATENT DOCUMENTS 7,385,535 B2 * 6/2008 Yang .................. H03M 7/4006 341/107
7,898,445 B2 3/2011 Otsuka
(Continued)

FOREIGN PATENT DOCUMENTS

EP 1797536 B1 9/2009
JP 2008-113374 A 5/2008
(Continued)

OTHER PUBLICATIONS

Yagasaki et al. "JP 2011-061877 Translation". Mar. 2011.*
(Continued)

*Primary Examiner* — Christopher S Kelley
*Assistant Examiner* — Zhihan Zhou
(74) *Attorney, Agent, or Firm* — Sughrue Mion, PLLC

(57) ABSTRACT

A method of decoding a video through symbol decoding includes parsing symbols of image blocks from a received bitstream; classifying a current symbol into a prefix bit string and a suffix bit string based on a threshold value determined according to a size of a current block; performing arithmetic decoding of the prefix bit string and the suffix bit string by using respective arithmetic decoding methods determined for each of the prefix bit string and the suffix bit string; performing inverse binarization of the prefix bit string and the suffix bit string by using respective binarization methods determined for each of the prefix bit string and the suffix bit string; and restoring the image blocks by performing an inverse transformation operation and a prediction operation on the current block by using the current symbol restored through the arithmetic decoding and the inverse binarization.

1 Claim, 15 Drawing Sheets

(51) Int. Cl.

| | |
|---|---|
| ***H04N 19/593*** | (2014.01) |
| ***H04N 19/91*** | (2014.01) |
| ***H04N 19/169*** | (2014.01) |
| ***H04N 19/157*** | (2014.01) |
| ***H04N 19/176*** | (2014.01) |
| ***H04N 19/44*** | (2014.01) |

(52) U.S. Cl.

CPC ........ *H04N 19/176* (2014.11); *H04N 19/1883* (2014.11); *H04N 19/44* (2014.11); *H04N 19/60* (2014.11); *H04N 19/91* (2014.11)

(56) References Cited

U.S. PATENT DOCUMENTS

| | | | | |
|---|---|---|---|---|
| 8,780,980 | B2 | 7/2014 | Yamaguchi | |
| 2005/0038837 | A1 | 2/2005 | Marpe et al. | |
| 2005/0071496 | A1 | 3/2005 | Singal et al. | |
| 2005/0123207 | A1* | 6/2005 | Marpe et al. | 382/239 |
| 2007/0110153 | A1 | 5/2007 | Cho et al. | |
| 2007/0171985 | A1* | 7/2007 | Kim et al. | 375/240.26 |
| 2007/0242894 | A1* | 10/2007 | Kautzer | H04N 19/46 382/243 |
| 2008/0212683 | A1 | 9/2008 | Nakata et al. | |
| 2011/0090967 | A1 | 4/2011 | Chen et al. | |
| 2012/0140814 | A1* | 6/2012 | Sole Rojals et al. | 375/240.02 |
| 2013/0051472 | A1* | 2/2013 | Wiegand et al. | 375/240.16 |
| 2014/0198841 | A1 | 7/2014 | George et al. | |

FOREIGN PATENT DOCUMENTS

| | | | |
|---|---|---|---|
| JP | 2008-124926 | A | 5/2008 |
| JP | 201 1-061 877 | A | 3/2011 |
| JP | 2011-120047 | A | 6/2011 |
| JP | 2014-504077 | A | 2/2014 |
| JP | 2014-520451 | A | 8/2014 |
| KR | 10-2007-0051681 | A | 5/2007 |
| KR | 10-0718134 | B1 | 5/2007 |
| KR | 10-2009-0129939 | A | 12/2009 |
| WO | 03/094529 | A2 | 11/2003 |
| WO | 2010/021699 | A1 | 2/2010 |
| WO | 2011128268 | A1 | 10/2011 |
| WO | 2012005551 | A2 | 1/2012 |
| WO | 2012075181 | A1 | 6/2012 |
| WO | 2012172114 | A1 | 12/2012 |

OTHER PUBLICATIONS

International Search Report (PCT/ISA/210), dated Jan. 10, 2013, issued by the International Searching Authority in counterpart International Patent Application No. PCT/KR2012/005087.

Communication dated May 12, 2014 issued by the Korean Intellectual Property Office in counterpart Korea Patent Application No. 10-2012-0069481.

Sole et al., "CE11: Parallel Context Processing for the significance map in high coding efficiency", Joint Collaborative Team on Video Coding (JCT-VC) of ITU-T SG16 WP# and ISO/IEC JTC1/SC29/WG11, Mar. 17, 2011, 6 pages.

Communication, Issued by the Korean Intellectual Property Office, Dated Aug. 19, 2014, in counterpart Korean application No. 10-2012-0069481.

Communication, Issued by the Japanese Patent Office, Dated Oct. 21, 2014, in counterpart Japanese Application No. 2014-518796.

Sole, et al.; "Parallel Context Processing for the Significance Map in High Coding Efficiency", Joint Collaborative Team on Video Coding (JCT-VC) of ITU-T SG16 WP3 and ISO/IEC JTC1/SC29/WG11, Jan. 2011, 4 pages total.

Budagavi, "TE8: TI Parallel Context Processing (PCP) Proposal", Joint Collaborative Team on Video Coding (JCT-VC) of ITU-T SG16 WP3 and ISO/IEC JTC1/SC29/WG11, Oct. 2010, 7 pages total.

Communication dated Feb. 17, 2015, issued by the European Patent Office in counterpart European Application No. 12804190.2.

Communication dated Mar. 10, 2015, issued by the European Patent Office in counterpart European Application No. 15153506.9.

Communication dated Mar. 2, 2015, issued by the European Patent Office in counterpart European Application No. 14192917.4.

Communication dated Feb. 17, 2015, issued by the European Patent Office in counterpart European Application No. 14192917.4.

Communication dated Feb. 24, 2015, issued by the Korean Intellectual Property Office in counterpart Korean Application No. 10-2014-0054356.

Communication dated Apr. 22, 2015, issued by the Korean Intellectual Property Office in counterpart Korean Application No. 10-2015-0040055.

Communication dated Apr. 22, 2015, issued by the Korean Intellectual Property Office in counterpart Korean Application No. 10-2015-0040056.

Communication dated Oct. 2, 2015 issued by the Russian Patent Office in counterpart Application No. 2014102581/07.

Marpe D. et al, Context-based adaptive binary arithmetic coding in the H.264/AVC video compression standard, IEEE Transactions on Circuits and Systems for Video Technology, Piscataway, vol. 13, No. 7, Jul. 1, 2003, pp. 620-636.

Communication dated Dec. 15, 2015 issued by the Japanese Patent Office in counterpart Japanese Patent Application No. 2015-084083.

T. Nguyen et al; "Reduced-complexity entropy coding of transform coefficient levels using a combination of VLC and PIPE"; Joint Collaborative Team on Video Coding (JCT/VC) of ITU-T SG16 WP3 and ISO/IEC JTC1/SC29/WG11; Jan. 2011; Document: JCTVC-D336; 9 pages total.

J. Sole et al; "Parallel Context Processing for the significance map in high coding efficiency"; Joint Collaborative Team on Video Coding (JCT-VC) of ITU-T SG16 WP3 and ISO/IEC JTC1/SC29/WG11; Jan. 2011; Document: JCTVC-D262; 5 pages total.

Hisao Sasai et al; "Parallel Context Processing for Significance map using block-based context updates"; Joint Collaborative Team on Video Coding (JCT-VC) of ITU-T SG16 WP3 and ISO/IEC JTC1/SC29/WG11; Mar. 16-23, 2011; Document: JCTVC-E226; 5 pages total.

J Sole et al; "CE11: Parallel Context Processing for the significance map in high coding efficiency"; Joint Collaborative Team on Video Coding (JCT-VC) of ITU-T SG16 WP3 and ISO/IEC JTC1/SC29/WG11; Document: JCTVC-E338; Mar. 2011; 6 pages total.

Vadim Seregin et al; "Binarisation modification for last position coding"; Joint Collaborative Team on Video Coding (JCT-VC) of ITU-T SG16 WP3 and ISO/IEC JTC1/SC29/WG11; Document: JCTVC-F375; Jul. 2011; 11 pages total.

* cited by examiner

CODING UNIT (1010)

METHOD AND APPARATUS FOR CODING VIDEO AND METHOD AND APPARATUS FOR DECODING VIDEO ACCOMPANIED WITH ARITHMETIC CODING

CROSS-REFERENCE TO RELATED APPLICATIONS

This application is a continuation application of U.S. Ser. No. 14/130,052, filed on Dec. 30, 2013 in the U.S. Patent and Trademark Office, which is a National Stage Entry of PCT/KR2012/005087, filed on Jun. 27, 2012, which claims priority to U.S. provisional patent application No. 61/502,038 filed on Jun. 28, 2011 in the U.S. Patent and Trademark Office, the entire disclosures of which are herein incorporated by reference in their entirety.

TECHNICAL FIELD

Exemplary embodiments relate to video encoding and video decoding involving arithmetic encoding and arithmetic decoding, respectively.

BACKGROUND OF THE RELATED ART

As hardware for reproducing and storing high resolution or high quality video content is being developed and supplied, a need for a video codec for effectively encoding or decoding the high resolution or high quality video content is increasing. In a conventional video codec, a video is encoded according to a limited encoding method based on a macroblock having a predetermined size.

Image data of a spatial domain is converted to coefficients of a frequency region by using a frequency conversion method. A video codec encodes frequency coefficients in units of blocks by dividing an image into a plurality of blocks having a predetermined size and performing discrete cosine transformation (DCT) conversion for rapid operation of frequency conversion. The coefficients of the frequency region are easily compressed compared to the image data of the spatial domain. In particular, a pixel value of an image in the spatial domain is represented as a prediction error, and thus, if frequency conversion is performed on the prediction error, a large amount of data may be converted to 0. A video codec converts data that is continuously and repeatedly generated into smaller data to reduce an amount of data.

SUMMARY

Exemplary embodiments provide a method and apparatus for performing arithmetic encoding and arithmetic decoding of a video by classifying a symbol into prefix and suffix bit strings.

According to an aspect of an exemplary embodiment, there is provided a method of decoding a video through symbol decoding, the method including: parsing symbols of image blocks from a received bitstream; classifying a current symbol into a prefix bit string and a suffix bit string based on a threshold value determined according to a size of a current block; performing arithmetic decoding of the prefix bit string and the suffix bit string by using respective arithmetic decoding methods determined for each of the prefix bit string and the suffix bit string; performing inverse binarization of the prefix bit string and the suffix bit string by using respective binarization methods determined for each of the prefix bit string and the suffix bit string; and restoring the image blocks by performing an inverse transformation operation and a prediction operation on the current block by using the current symbol restored through the arithmetic decoding and the inverse binarization.

Efficiency of a symbol encoding/decoding process is improved by performing a binarization method having a relatively small amount of operation burden on the suffix region or the suffix bit string or by omitting the context modeling during the context-based arithmetic encoding/decoding for symbol encoding/decoding.

The performing of the inverse binarization may include restoring a prefix region and a suffix region of the current symbol by performing the inverse binarization according to the respective binarization methods determined for each of the prefix bit string and the suffix bit string.

The performing of the arithmetic decoding may include: performing arithmetic decoding for determining context modeling on the prefix bit string according to locations of bits; and performing arithmetic decoding for omitting the context modeling on the suffix bit string in a bypass mode.

The performing of the arithmetic decoding may include performing the arithmetic decoding by using a context of a predetermined index that is previously allocated to locations of bits of the prefix bit string, when the symbol is final coefficient position information of a transformation coefficient.

The current symbol may include at least one of an intra prediction mode and final coefficient position information of the current block.

The binarization method further may include at least one selected from the group consisting of unary binarization, truncated unary binarization, exponential golomb binarization, and fixed length binarization.

According to another aspect of an exemplary embodiment, there is provided a method of encoding a video through symbol encoding, the method including: generating symbols by performing a prediction operation and a transformation operation on image blocks; classifying a current symbol into a prefix region and a suffix region based on a threshold value determined according to a size of a current block; generating a prefix bit string and a suffix bit string by using respective binarization methods determined for each of the prefix region and the suffix region; performing symbol encoding of the prefix bit string and the suffix bit string by using respective arithmetic encoding methods determined for each of the prefix bit string and the suffix bit string; and outputting bit strings generated through the symbol encoding in the form of bitstreams.

The performing of the symbol encoding may include: performing the symbol encoding on the prefix bit string by using an arithmetic encoding method for performing context modeling according to locations of bits; and performing the symbol encoding on the suffix bit string by using an arithmetic encoding method for omitting the context modeling in a bypass mode.

The performing of the symbol encoding may include performing the arithmetic encoding by using a context of a predetermined index that is previously allocated to locations of bits of the prefix bit string, when the symbol is final coefficient position information of a transformation coefficient.

The current symbol may include at least one of an intra prediction mode and final coefficient position information of the current block.

The binarization method may further include at least one selected from the group consisting of unary binarization, truncated unary binarization, exponential golomb binarization, and fixed length binarization.

According to another aspect of an exemplary embodiment, there is provided an apparatus configured to decode a video through symbol decoding, the apparatus including: a parser configured to parse symbols of image blocks from a received bitstream; a symbol decoder configured to classify a current symbol into a prefix bit string and a suffix bit string based on a threshold value determined according to a size of a current block, and to perform arithmetic decoding of the prefix bit string and the suffix bit string by using respective arithmetic decoding methods determined for each of the prefix bit string and the suffix bit string, and to perform inverse binarization of the prefix bit string and the suffix bit string by using respective binarization methods determined for each of the prefix bit string and the suffix bit string; and an image restorer configured to restore the image blocks by performing an inverse transformation operation and a prediction operation on the current block by using the current symbol restored through the arithmetic decoding and the inverse binarization.

According to another aspect of an exemplary embodiment, there is provided an apparatus configured to encode a video through symbol encoding, the apparatus including: an image encoder configured to generate symbols by performing prediction and transformation on image blocks; a symbol encoder configured to classify a current symbol into a prefix region and a suffix region based on a threshold value determined according to a size of a current block, and to generate a prefix bit string and a suffix bit string by using respective binarization methods determined for each of the prefix region and the suffix region, and to perform symbol encoding of the prefix bit string and the suffix bit string by using arithmetic encoding methods determined for each of the prefix bit string and the suffix bit string; and a bitstream outputter configured to output bit strings generated through the symbol encoding in the form of bitstreams.

According to another aspect of an exemplary embodiment, there is provided a non-transitory computer readable recording medium having embodied thereon a computer program for executing the method of decoding a video through symbol decoding.

According to another aspect of an exemplary embodiment, there is provided a non-transitory computer readable recording medium having embodied thereon a computer program for executing the method of encoding a video through symbol encoding.

DETAILED DESCRIPTION OF EXEMPLARY EMBODIMENTS

Hereinafter, the exemplary embodiments will be described more fully with reference to the accompanying drawings, in which exemplary embodiments are shown. Expressions such as "at least one of," when preceding a list of elements, modify the entire list of elements and do not modify the individual elements of the list.

A video encoding method involving arithmetic encoding and a video decoding method involving arithmetic decoding according to an exemplary embodiment will be described with reference to FIGS. 1 to 6. Also, a video encoding method involving arithmetic encoding and a video decoding method involving arithmetic decoding based on coding units having a tree structure according to an exemplary embodiment will be described with reference to FIGS. 7 to 19. Hereinafter, an 'image' may refer to a still image of a video or a movie, that is, a video itself.

Hereinafter, a video encoding method and a video decoding method based on a prediction method in an intra prediction mode, according to an exemplary embodiment, will be described with reference to FIGS. 1 to 6.

Figure 1:
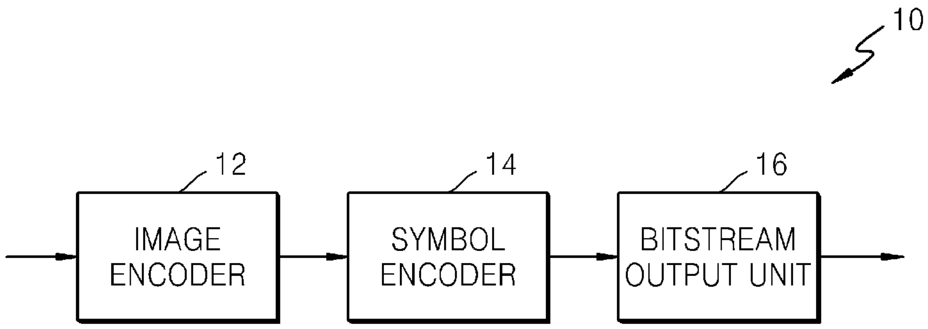
FIG. 1 is a block diagram of a video encoding apparatus, according to an exemplary embodiment.

FIG. 1 is a block diagram of a video encoding apparatus 10, according to an exemplary embodiment.

The video encoding apparatus 10 may encode video data of a spatial domain through intra prediction/inter prediction, transformation, quantization, and symbol encoding. Hereinafter, operations occurring when the video encoding apparatus 10 encodes symbols generated by the intra prediction/inter prediction, the transformation, and the quantization through arithmetic encoding will be described in detail.

The video encoding apparatus 10 includes an image encoder 12, a symbol encoder 14, and a bitstream output unit 16 (e.g., bitstream outputter).

The video encoding apparatus 10 may split image data of a video into a plurality of data units and encode the image data according to the data units. The data unit may have a square shape or a rectangular shape, or may be an arbitrary geometric shape, but the data unit is not limited to a data unit having a predetermined size. According to the video encoding method based on the coding units having a tree structure, a data unit may be a maximum coding unit, a coding unit, a prediction unit, a transformation unit, or the like. An example where an arithmetic encoding/decoding method according to an exemplary embodiment is used in the video encoding/decoding method based on the coding units having a tree structure will be described with reference to FIGS. 7 to 19.

For convenience of description, a video encoding method for a 'block' which is a kind of data unit will be described in detail. However, the video encoding method according to various exemplary embodiments is not limited to the video encoding method for the 'block', and may be used for various data units.

The image encoder 12 performs operations, such as intra prediction and inter prediction, transformation, or quantization, on image blocks to generate symbols.

The symbol encoder 14 classifies a current symbol into a prefix region and a suffix region based on a threshold value determined according to a size of a current block to encode the current symbol from among the symbols generated according to the blocks. The symbol encoder 14 may determine the threshold value for classifying the current symbol into the prefix region and the suffix region based on at least one of a width and a height of the current block.

The symbol encoder 14 may determine a symbol encoding method for each of the prefix region and the suffix region and encode each of the prefix region and the suffix region according to the symbol encoding method.

Symbol encoding may be divided into a binarization process for transforming a symbol into bit strings and an arithmetic encoding process for performing context-based arithmetic encoding on the bit strings. The symbol encoder 14 may determine a binarization method for each of the prefix region and the suffix region of the symbol and perform binarization on each of the prefix region and the suffix region according to the binarization method. A prefix bit string and a suffix bit string may be generated from the prefix region and the suffix region, respectively.

Alternatively, the symbol encoder 14 may determine an arithmetic encoding method for each of the prefix bit string and the suffix bit string of the symbol and perform arithmetic encoding on each of the prefix bit string and the suffix bit string according to the arithmetic encoding method.

Also, the symbol encoder 14 may determine a binarization method for each of the prefix region and the suffix region of the symbol and perform binarization on each of the prefix region and the suffix region according to the binarization method, and may determine an arithmetic encoding method for each of the prefix bit string and the suffix bit string of the symbol and perform arithmetic encoding on the prefix bit string and the suffix bit string according to the arithmetic encoding method.

The symbol encoder 14 according to an exemplary embodiment may determine a binarization method for each of the prefix region and the suffix region. The binarization methods determined for the prefix region and the suffix region may be different from each other.

The symbol encoder 14 may determine an arithmetic encoding method for each of the prefix bit string and the suffix bit string. The arithmetic encoding methods determined for the prefix bit string and the suffix bit string may be different from each other.

Accordingly, the symbol encoder 14 may binarize the prefix region and the suffix region by using different methods only in a binarization process of a symbol decoding process, or may encode the prefix bit string and the suffix bit string by using different methods only in an arithmetic encoding process. Also, the symbol encoder 14 may encode the prefix region (prefix bit string) and the suffix region (suffix bit string) by using different methods in both the binarization and arithmetic encoding processes.

The selected binarization method may be at least one of general binarization, unary binarization, truncated unary binarization, exponential golomb binarization, and fixed length binarization methods.

The symbol encoder 14 may perform symbol encoding by performing arithmetic encoding for performing context modeling on the prefix bit string according to locations of bits and by performing arithmetic encoding for omitting context modeling on the suffix bit string in a bypass mode.

The symbol encoder 14 may individually perform the symbol encoding on the prefix region and the suffix region with respect to symbols including at least one of an intra prediction mode and final coefficient position information of a transformation coefficient.

The symbol encoder 14 may also perform the arithmetic encoding by using a context of a predetermined index that is previously allocated to the prefix bit string. For example, the symbol encoder 14 may perform arithmetic encoding by using a context of a predetermined index that is previously allocated to each location of the bits of the prefix bit string when the symbol is final coefficient position information of the transformation coefficient.

The bitstream output unit 16 outputs bit strings generated through the symbol encoding in the form of bitstreams.

The video encoding apparatus 10 may perform arithmetic encoding on symbols of blocks of a video and output the symbols.

The video encoding apparatus 10 may include a central processor (not shown) for controlling each of the image encoder 12, the symbol encoder 14, and the bitstream output unit 16. Alternatively, the image encoder 12, the symbol encoder 14, and the bitstream output unit 16 may be operated by processors (not shown) respectively installed therein, and the entire video encoding apparatus 10 may be operated by systematically operating the processors (not shown). Alternatively, the image encoder 12, the symbol encoder 14, and the bitstream output unit 16 may be controlled by an external processor (not shown) of the video encoding apparatus 10.

The video encoding apparatus 10 may include at least one data storage unit (not shown) for storing data that is input/output to/from the image encoder 12, the symbol encoder 14, and the bitstream output unit 16. The video encoding apparatus 10 may include a memory controller (not shown) for controlling input/output of data stored in the data storage unit (not shown).

The video encoding apparatus 10 is operated by being linked with an internal video encoding processor or an external video encoding processor to perform video encoding including prediction and transformation, thereby outputting a result of the video encoding. The internal video encoding processor of the video encoding apparatus 10 may perform a basic video encoding operation not only by using a separate processor, but also by including a video encoding processing module in the video encoding apparatus 10, a central operating apparatus, or a graphic operating apparatus.

Figure 2:
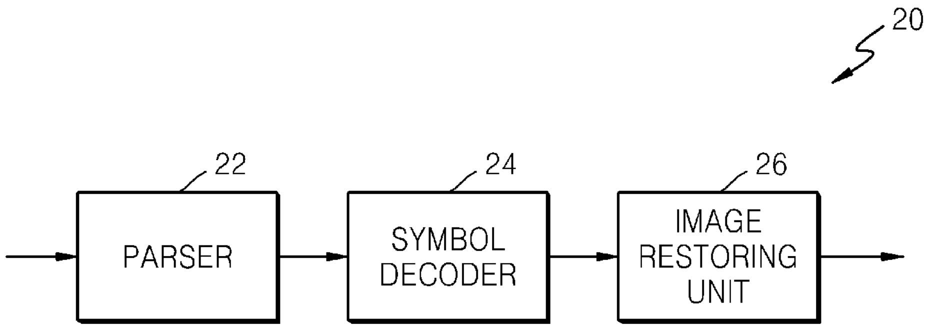
FIG. 2 is a block diagram of a video decoding apparatus, according to an exemplary embodiment of the present invention.

FIG. 2 is a block diagram of a video decoding apparatus 20, according to an exemplary embodiment.

The video decoding apparatus 20 may decode the video data encoded by the video encoding apparatus 10 through parsing, symbol decoding, inverse quantization, inverse transformation, intra prediction/motion compensation, etc. and restore the video data close to the original video data of the spatial domain. Hereinafter, a process in which the video decoding apparatus 20 performs arithmetic decoding on the parsed symbols from a bitstream to restore the symbols will be described.

The video decoding apparatus 20 includes a parser 22, a symbol decoder 24, and an image restoring unit 26 (e.g., image restorer).

The video decoding apparatus 20 may receive a bitstream including encoded data of a video. The parser 22 may parse symbols of image blocks from the bitstream.

The parser 22 may parse the symbols encoded through arithmetic encoding with respect to the blocks of the video from the bitstream.

The parser 22 may parse symbols including an intra prediction mode of the block of the video, final coefficient position information of a transformation coefficient, etc. from the received bitstream.

The symbol decoder 24 determines a threshold value for classifying a current symbol into a prefix bit string and a suffix bit string. The symbol decoder 24 may determine the threshold value for classifying the current symbol into the prefix bit string and the suffix bit string based on a size of a current block, that is, at least one of a width and a height of the current block. The symbol decoder 24 determines an arithmetic decoding method for each of the prefix bit string and the suffix bit string. The symbol decoder 24 performs symbol decoding by using the arithmetic decoding method determined for each of the prefix bit string and the suffix bit string.

The arithmetic decoding methods determined for the prefix bit string and the suffix bit string may be different from each other.

The symbol decoder 24 may determine a binarization method for each of the prefix bit string and the suffix bit string of the symbol. Accordingly, the symbol decoder 24 may perform inverse binarization on the prefix bit string of the symbol by using the binarization method. The binarization methods determined for the prefix bit string and the suffix bit string may be different from each other.

Also, the symbol decoder 24 may perform arithmetic decoding by using the arithmetic decoding method determined for each of the prefix bit string and the suffix bit string of the symbol, and may perform inverse binarization by using the binarization method determined for each of the prefix bit string and the suffix bit string generated through the arithmetic decoding.

Accordingly, the symbol decoder 24 may decode the prefix bit string and the suffix bit string by using different methods only in an arithmetic decoding process of a symbol decoding process, or may perform inverse binarization by using different methods only in an inverse binarization process. Also, the symbol decoder 24 may decode the prefix bit string and the suffix bit string by using different methods in both the arithmetic decoding and inverse binarization processes.

The binarization method determined for each of the prefix bit string and the suffix bit string of the symbol may not only be a general binarization method, but may also be at least one of unary binarization, truncated unary binarization, exponential golomb binarization, and fixed length binarization methods.

The symbol decoder 24 may perform arithmetic decoding for performing context modeling on the prefix bit string according to locations of bits. The symbol decoder 24 may use an arithmetic decoding method for omitting context modeling on the suffix bit string in a bypass mode. Accordingly, the symbol decoder 24 may perform symbol decoding through the arithmetic decoding performed on each of the prefix bit string and the suffix bit string of the symbol.

The symbol decoder 24 may perform the arithmetic decoding on the prefix bit string and the suffix bit string of symbols including at least one of an intra prediction mode and final coefficient position information of a transformation coefficient.

The symbol decoder 24 may perform arithmetic decoding by using a context of a predetermined index that is previously allocated according to locations of the bits of the prefix bit string when the symbol is information about the final coefficient position of the transformation coefficient.

The image restoring unit 26 may restore a prefix region and a suffix region of a symbol by performing the arithmetic decoding and the inverse binarization on each of the prefix bit string and the suffix bit string. The image restoring unit 26 may restore the symbol by synthesizing the prefix region and the suffix region of the symbol.

The image restoring unit 26 performs inverse transformation and prediction on the current block by using the current symbol restored through the arithmetic decoding and the inverse binarization. The image restoring unit 26 may restore image blocks by performing operations, such as inverse quantization, inverse transformation, or intra prediction/motion compensation, by using the corresponding symbols for each of the image blocks.

The video decoding apparatus 20 according to an exemplary embodiment may include a central processor (not shown) for controlling each of the parser 22, the symbol decoder 24, and the image restoring unit 26. Alternatively, the parser 22, the symbol decoder 24, and the image restoring unit 26 may be operated by processors (not shown) respectively installed therein, and the entire video decoding apparatus 20 may be operated by systematically operating the processors (not shown). Alternatively, the parser 22, the symbol decoder 24, and the image restoring unit 26 may be controlled by an external processor (not shown) of the video decoding apparatus 20.

The video decoding apparatus 20 may include at least one data storage unit (not shown) for storing data that is input and output to and from the parser 22, the symbol decoder 24, and the image restoring unit 26. The video decoding apparatus 20 may include a memory controller (not shown) for controlling input/output of data stored in the data storage unit (not shown).

The video decoding apparatus 20 is operated by being linked with an internal video decoding processor or an external video decoding processor to perform video decoding including inverse transformation. The internal video decoding processor of the video decoding apparatus 20 may perform a basic video decoding operation not only by using a separate processor, but also by including a video decoding processing module in the video decoding apparatus 20, a central operating apparatus, or a graphic operating apparatus.

Context-based adaptive binary arithmetic coding (CABAC) is widely used as an arithmetic encoding and decoding method based on a context for symbol encoding and decoding. According to the context-based arithmetic encoding and decoding, each bit of a symbol bit string may be a bin of a context, and a location of each bit may be mapped to a bin index. A length of the bit string, that is, a length of the bin, may vary according to a size of a symbol value. Context modeling for determining a context of a symbol is required to perform the context-based arithmetic encoding and decoding. The context is renewed according to locations of bits of the symbol bit string, that is, in each bin index, to perform the context modeling, and thus a complicated operation process is required.

According to the video encoding apparatus 10 and the video decoding apparatus 20 described with reference to FIGS. 1 and 2, the symbol is classified into the prefix region and the suffix region, and a relatively simple binarization method may be used for the suffix region compared to the prefix region. Also, the arithmetic encoding and decoding through the context modeling is performed on the prefix bit string, and the context modeling is not performed on the suffix bit string, and thus a burden of an operation amount for the context-based arithmetic encoding and decoding may be reduced. Accordingly, the video encoding apparatus 10 and the video decoding apparatus 20 may improve efficiency of a symbol encoding and decoding process by performing a binarization method having a relatively small amount of operation burden on the suffix region or the suffix bit string or by omitting the context modeling during the context-based arithmetic encoding and decoding for symbol encoding and decoding.

Hereinafter, various exemplary embodiments for arithmetic encoding that may be performed by the video encoding apparatus 10 and the video decoding apparatus 20 will be described.

Figure 3:
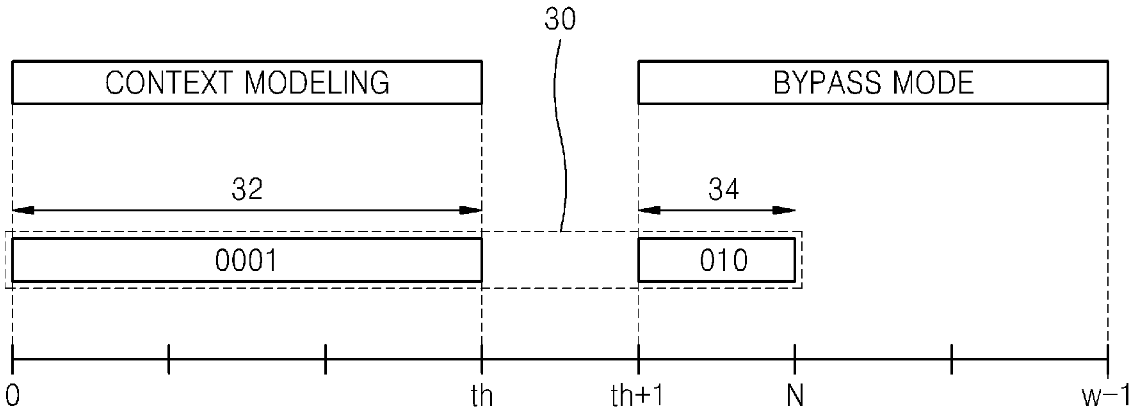
FIGS. 3 and 4 are diagrams for describing arithmetic encoding by classifying a symbol into a prefix bit string and a suffix bit string according to a predetermined threshold value, according to an exemplary embodiment.
Figure 4:
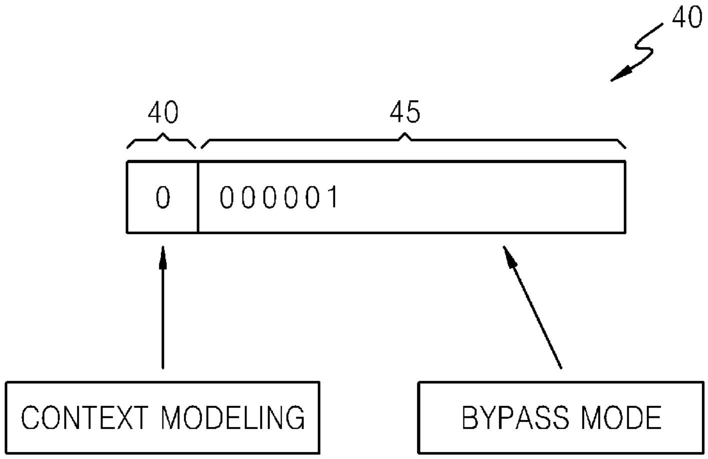

FIGS. 3 and 4 are diagrams for describing arithmetic encoding by classifying a symbol into a prefix bit string and a suffix bit string according to a predetermined threshold value, according to an exemplary embodiment.

Referring to FIG. 3, a process of performing symbol encoding, according to an exemplary embodiment, on final coefficient position information of a symbol will be described in detail. The final coefficient position information is a symbol representing a location of a final coefficient, not 0, from among transformation coefficients of a block. Since a size of the block is defined as a width and a height, the final coefficient position information may be represented by two-dimensional coordinates, that is, an x-coordinate in a width direction and a y-coordinate in a height direction. For convenience of description, FIG. 3 shows a case where symbol encoding is performed on the x-coordinate in the width direction from among the final coefficient position information when a width of a block is w.

A range of the x-coordinate of the final coefficient position information is within the width of the block, and thus the x-coordinate of the final coefficient position information is equal to or greater than 0 and equal to or less than w−1. For the arithmetic encoding of the symbol, the symbol may be classified into a prefix region and a suffix region based on a predetermined threshold value th. Thus, the arithmetic encoding may be performed on the prefix bit string in which the prefix region is binarized, based on the context determined through the context modeling. Also, the arithmetic encoding may be performed on the suffix bit string in which the suffix region is binarized, in a bypass mode in which the context modeling is omitted.

Here, the threshold value th for classifying the symbol into the prefix region and the suffix region may be determined based on the width w of the block. For example, the threshold value th may be determined to be (w/2)−1 to divide the bit string by two (threshold value determination formula 1, shown below). Alternatively, the width w of the block generally has a square of 2, and thus the threshold value th may be determined based on a log value of the width w (threshold value determination formula 2, shown below).

<threshold value determination formula 1>$th=(w/2)-1$;

<threshold value determination formula 2>$th=(\log 2w<<1)-1$;

In FIG. 3, according to the threshold value determination formula 1, when the width w of the block is 8, the formula outputs threshold value th=(8/2)−1=3. Thus, in the x-coordinate of the final coefficient position information, 3 may be classified as the prefix region, and the rest of values other than 3 may be classified as the suffix region. The prefix region and the suffix region may be binarized according to the binarization method determined for each of the prefix region and the suffix region.

When an x-coordinate N of current final coefficient position information is 5, the x-coordinate of the final coefficient position information may be classified as N=th+2=3+2. In other words, in the x-coordinate of the final coefficient position information, 3 may be classified as the prefix region, and 2 may be classified as the suffix region.

According to an exemplary embodiment, the prefix region and the suffix region may be binarized according to different binarization methods determined for the prefix region and the suffix region, respectively. For example, the prefix region may be binarized according to a unary binarization method, and the suffix region may be binarized according to a general binarization method.

Accordingly, after 3 is binarized according to the unary binarization method, a prefix bit string 32 '0001' may be generated from the prefix region, and after 2 is binarized according to the general binarization method, a suffix bit string 34 '010' may be generated from the suffix region.

Also, context-based arithmetic encoding may be performed on the prefix bit string 32 '0001' through context modeling. Thus, a context index may be determined for each bin of the prefix bit string 32 '0001'.

Arithmetic encoding may be performed on the suffix bit string 34 '010' in a bypass mode without performing context modeling. The arithmetic encoding may be performed without performing the context modeling assuming that in the bypass mode each bin has a context of an equal probability state, that is, the context of 50%.

Accordingly, the context-based arithmetic encoding may be performed on each of the prefix bit string 32 '0001' and the suffix bit string 34 '010' to complete the symbol encoding with respect to the x-coordinate N of the current final coefficient position information.

Although the exemplary embodiment in which the symbol encoding is performed via the binarization and the arithmetic encoding has been described, symbol decoding may be performed in the same manner. In other words, a parsed symbol bit string may be classified into a prefix bit string and a suffix bit string based on the width w of the block, the arithmetic decoding may be performed on the prefix bit string 32 through the context modeling, and the arithmetic decoding may be performed on the suffix bit string 34 without performing the context modeling. Inverse binarization may be performed on the prefix bit string 32 after the arithmetic decoding by using the unary binarization method, and the prefix region may be restored. Also, the inverse binarization may be performed on the suffix bit string 34 after the arithmetic encoding by using the general binarization method, and thus the suffix region may be restored. The symbol may be restored by synthesizing the restored prefix region and suffix region.

Although the exemplary embodiment in which the unary binarization method is used for the prefix region (prefix bit string) and the general binarization method is used for the suffix region (suffix bit string) has been described, the binarization method is not limited thereto. Alternatively, for example, a truncated unary binarization method may be used for the prefix region (prefix bit string), and a fixed length binarization method may be used for the suffix region (suffix bit string).

Although only the exemplary embodiment regarding the final coefficient position information in a width direction of the block has been described, an exemplary embodiment regarding a final coefficient position information in a height direction of the block may also be used.

Also, there is no need to perform context modeling on the suffix bit string for performing the arithmetic encoding by using a context having a fixed probability, but there may be a need to perform variable context modeling on the prefix bit string. The context modeling to be performed on the prefix bit string may be determined according to a size of the block.

<Context Mapping Table>

| Block Size | Bin Index No. of Selected Context |
|---|---|
| 4 × 4 | 0, 1, 2, 2 |
| 8 × 8 | 3, 4, 5, 5 |
| 16 × 16 | 6, 7, 8, 9, 10, 10, 11, 11 |
| 32 × 32 | 12, 13, 14, 15, 16, 16, 16, 16, 17, 17, 17, 17, 18, 18, 18, 18 |

In the context mapping table, a location of each number corresponds to the bin index of the prefix bit string, and the number denotes a context index to be used in a location of the corresponding bit. For convenience of description, for example, in a 4×4 block, the prefix bit string is comprised of a total of four bits, and when k is 0, 1, 2, and 3 according to the context mapping table, the context indexes 0, 1, 2, and 2 are determined for a k-th bin index, and thus arithmetic encoding based on the context modeling may be performed.

FIG. 4 shows an exemplary embodiment in which an intra prediction mode includes a luma intra mode and a chroma intra mode indicating an intra prediction direction of a luma block and a chroma block, respectively. When the intra prediction mode is 6, a symbol bit string 40 '0000001' is generated according to a unary binarization method. In this case, arithmetic encoding may be performed on a first bit 41 '0' of the symbol bit string 40 of the intra prediction mode, through context modeling, and arithmetic encoding may be performed on the rest of bits 45 '000001' of the symbol bit string 40, in a bypass mode. In other words, the first bit 41 of the symbol bit string 40 corresponds to a prefix bit string, and the rest of bits 45 of the symbol bit string 40 correspond to a suffix bit string.

How many bits of the symbol bit string 40 are encoded in arithmetic encoding as the prefix bit string through the context modeling and how many bits of the symbol bit string 40 are encoded in arithmetic encoding as the suffix bit string in the bypass mode may be determined according to a size of a block or a size of a set of blocks. For example, regarding a 64×64 block, arithmetic encoding may be performed only on a first bit from among bit strings of an intra prediction mode, and arithmetic encoding may be performed on the rest of bits in a bypass mode. Regarding blocks having other sizes, arithmetic encoding may be performed on all bits of the bit strings of the intra prediction mode in the bypass mode.

In general, information about bits close to a least significant bit (LSB) is relatively less important than information about bits close to a most significant bit (MSB) of a symbol bit string. Accordingly, the video encoding apparatus 10 and the video decoding apparatus 20 may select an arithmetic encoding method according to a binarization method having a relatively high accuracy with respect to the prefix bit string close to the MSB even though there is a burden of an operation amount, and may select an arithmetic encoding method according to a binarization method capable of performing a simple operation with respect to the suffix bit string close to the LSB. Also, the video encoding apparatus 10 and the video decoding apparatus 20 may select an arithmetic encoding method based on context modeling with respect to the context modeling and may select an arithmetic encoding method, not performing context modeling, with respect to the suffix bit string close to the LSB.

In the above description, the exemplary embodiment in which binarization is performed on the prefix bit string and the suffix bit string of the final coefficient position information of the transformation coefficient by using different methods has been described with reference to FIG. 3. Also, the exemplary embodiment in which arithmetic encoding is performed on the prefix bit string and the suffix bit string from among the bit strings of the intra prediction mode by using different methods has been described with reference to FIG. 4.

However, according to various exemplary embodiments, a symbol encoding method in which binarization and arithmetic encoding methods individually determined for the prefix bit string and the suffix bit string are used or different binarization and arithmetic encoding methods are used is not limited to the exemplary embodiments described with reference to FIGS. 3 and 4, and various binarization and arithmetic encoding methods may be used for various symbols.

Figure 5:
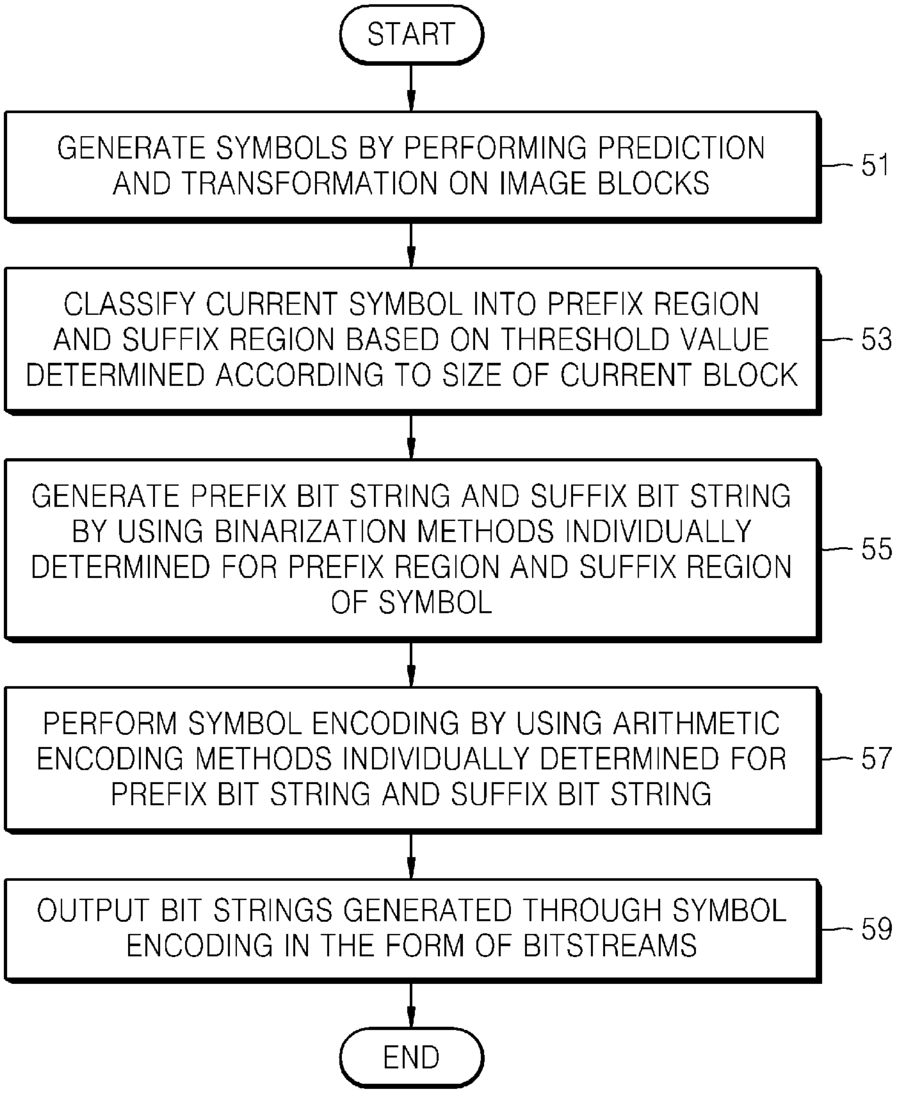
FIG. 5 is a flowchart for describing a video encoding method, according to an exemplary embodiment.

FIG. 5 is a flowchart for describing a video encoding method, according to an exemplary embodiment.

In operation 51, symbols are generated by performing prediction and transformation on image blocks.

In operation 53, a current symbol is classified into a prefix region and a suffix region based on a threshold value determined according to a size of a current block.

In operation 55, a prefix bit string and a suffix bit string are generated by using binarization methods individually determined for the prefix region and the suffix region of the symbol.

In operation 57, symbol encoding is performed by using arithmetic encoding methods individually determined for the prefix bit string and the suffix bit string.

In operation 59, bit strings generated through the symbol encoding are output in the form of bitstreams.

In operation 57, the symbol encoding may be performed on the prefix bit string by using an arithmetic encoding method for performing context modeling according to locations of bits, and the symbol encoding may also be performed on the suffix bit string by using an arithmetic encoding method for omitting the context modeling in a bypass mode.

In operation 57, when the symbol is final coefficient position information of a transformation coefficient, the arithmetic encoding may be performed by using a context of a predetermined index that is previously allocated to the locations of the bits of the prefix bit string.

Figure 6:
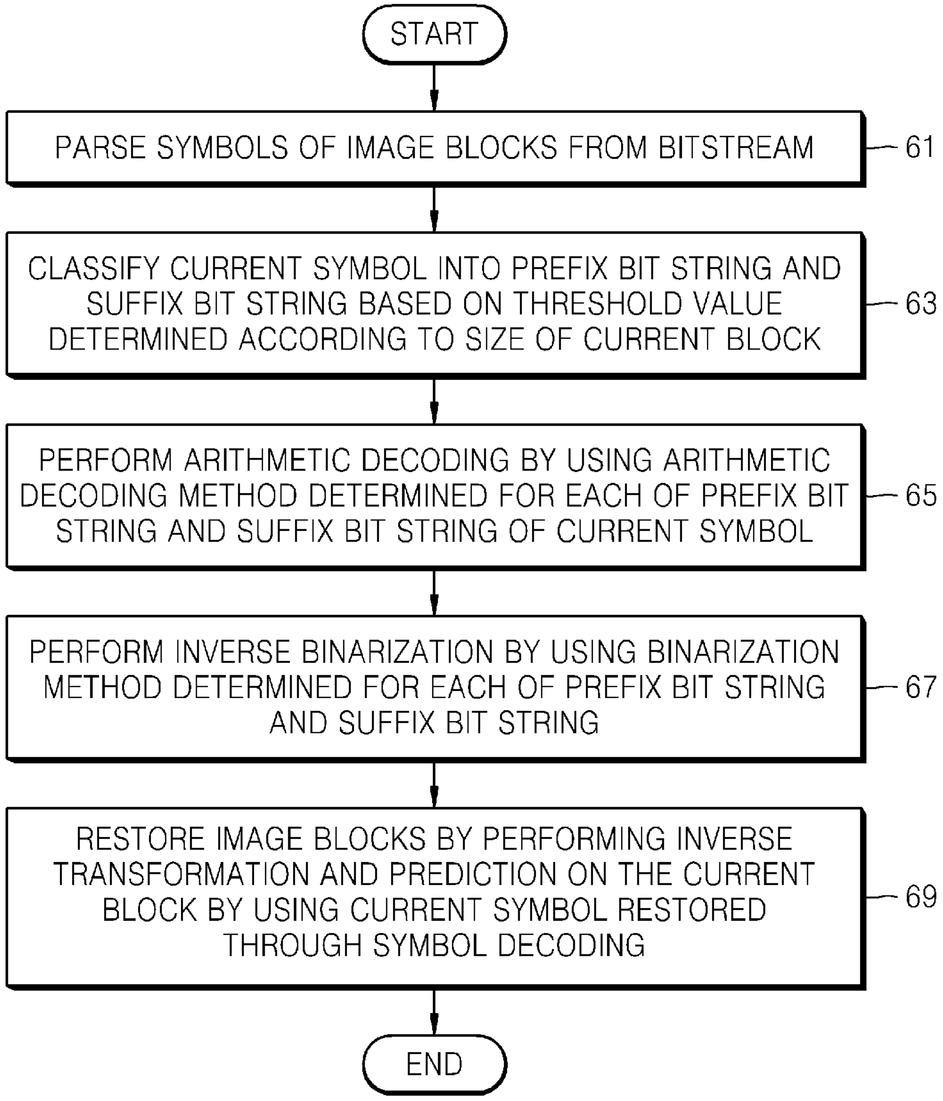
FIG. 6 is a flowchart for describing a video decoding method, according to an exemplary embodiment.

FIG. 6 is a flowchart for describing a video decoding method, according to an exemplary embodiment.

In operation 61, symbols of image blocks are parsed from a received bitstream.

In operation 63, a current symbol is classified into a prefix bit string and a suffix bit string based on a threshold value determined according to a size of a current block.

In operation 65, arithmetic decoding is performed by using an arithmetic decoding method determined for each of the prefix bit string and the suffix bit string of the current symbol.

In operation 67, after the arithmetic decoding, inverse binarization is performed by using a binarization method determined for each of the prefix bit string and the suffix bit string.

The prefix region and the suffix region of the symbol may be restored by performing the inverse binarization by using the binarization method determined for each of the prefix bit string and the suffix bit string.

In operation 69, the image blocks may be restored by performing inverse transformation and prediction on the current block by using the current symbol restored through the arithmetic decoding and the inverse binarization.

In operation 65, the arithmetic decoding for determining the context modeling according to the locations of the bits may be performed on the prefix bit string, and the arithmetic decoding for omitting the context modeling may be performed on the suffix bit string in a bypass mode.

In operation 65, when the symbol is the final coefficient position information of the transformation coefficient, the arithmetic decoding may be performed by using the context of the predetermined index that is previously allocated to the locations of the bits of the prefix bit string.

In the video encoding apparatus 10 according to an exemplary embodiment and the video decoding apparatus 20 according to another exemplary embodiment, blocks in which video data is split are split into coding units having a tree structure, prediction units are used to perform intra prediction on the coding units, and a transformation unit is used to transform the coding units.

Hereinafter, a method and apparatus for encoding a video and a method and apparatus for decoding a video based on a coding unit having a tree structure, a prediction unit, and a transformation unit will be described.

Figure 7:
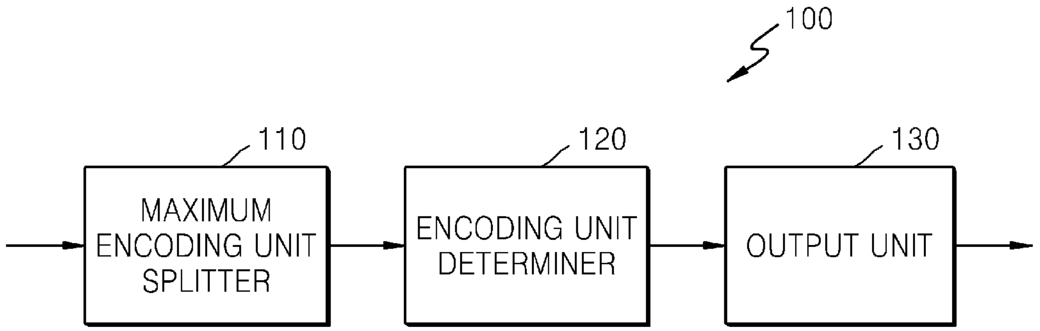
FIG. 7 is a block diagram of a video encoding apparatus based on coding units having a tree structure, according to an exemplary embodiment.

FIG. 7 is a block diagram of a video encoding apparatus 100 based on coding units having a tree structure, according to an exemplary embodiment.

The video encoding apparatus 100 involving video prediction based on the coding unit having a tree structure includes a maximum coding unit splitter 110, a coding unit determiner 120, and an output unit 130 (e.g., outputter). For convenience of description, the video encoding apparatus 100 involving video prediction based on the coding unit having a tree structure will be referred to as a video encoding apparatus 100.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to the regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The ‘coding units having a tree structure’ according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units which are generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, e.g., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit having a shape in which the prediction unit of the coding unit is divided, and the prediction unit may be a partition having the same size as the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a smallest encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a transformation unit for an intra mode and a transformation unit for an inter mode.

Similarly to the coding unit, the transformation unit in the coding unit may be recursively split into smaller sized regions. Thus, residual data in the coding unit may be divided according to the transformation having a tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the transformation unit size is N×N, and may be 2 when the transformation unit size is N/2×N/2. In other words, the transformation unit having a tree structure may be set according to transformation depths.

Encoding information according to coding units corresponding to a coded depth requires not only information about the coded depth, but also information related to prediction encoding and transformation. Accordingly, the coding unit determiner 120 not only determines a coded depth having a smallest encoding error, but also determines a partition type in a prediction unit, a prediction mode according to prediction units, and a size of a transformation unit for transformation.

Coding units according to a tree structure in a maximum coding unit and a method of determining a prediction unit and partition and a transformation unit, according to exemplary embodiments, will be described in detail later with reference to FIGS. 7 through 19.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and information about the size of the partitions. The encoding information according to the prediction units may include information about an estimated direction of an inter mode, information about a reference image index of the inter mode, information about a motion vector, information about a chroma component of an intra mode, and information about an interpolation method of the intra mode. Also, information about a maximum size of the coding unit defined according to pictures, slices, or groups of pictures (GOPs), and information about a maximum depth may be inserted into a sequence parameter set (SPS) or a picture parameter set (PPS).

Also, information about the maximum size of the transformation unit allowed for the current video and information about the minimum size of the transformation unit may be output via a header of a bitstream, an SPS, or a PPS. The output unit 130 may encode and output reference information, single-direction prediction information, slice type information including a fourth slice type, etc. related to the prediction described above with reference to FIGS. 1 to 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include at most 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit considering a size of the image.

The video encoding apparatus 100 of FIG. 7 may perform operations of the video encoding apparatus 10 described with reference to FIG. 1.

The coding unit determiner 120 may perform operations of the image encoder 12 of the video encoding apparatus 10. The coding unit determiner 120 may determine a prediction unit for intra prediction according to coding units having a tree structure for each maximum coding unit, perform the intra prediction in each prediction unit, determine a transformation unit for transformation, and perform transformation in each transformation unit.

The output unit 130 may perform operations of a symbol encoding unit 14 and a bitstream output unit 16 of the video encoding apparatus 10. Symbols for various data units, such as a picture, a slice, a maximum coding unit, a coding unit, a prediction unit, and a transformation unit, are generated, and each of the symbols is classified into a prefix region and a suffix region according to a threshold value determined based on a size of the corresponding data unit. The output unit 130 may generate a prefix bit string and a suffix bit string by using a binarization method determined for each of the prefix region and the suffix region of the symbol. Any one of a general binarization, a unary binarization, a truncated unary binarization, an exponential golomb binarization, and a fixed length binarization is selected to binarize the prefix region and the suffix region, thereby generating the prefix bit string and the suffix bit string.

The output unit 130 may perform symbol encoding by performing arithmetic encoding determined for each of the prefix bit string and the suffix bit string. The output unit 130 may perform symbol encoding by performing arithmetic encoding for performing context modeling according to locations of bits on the prefix bit string and by performing arithmetic encoding for omitting context modeling on the suffix bit string in a bypass mode.

For example, when final coefficient position information of a transformation coefficient of the transformation unit is encoded, the threshold value for classifying the prefix bit string and the suffix bit string may be determined according to a size (width or height) of the transformation unit. Alternatively, the threshold value may be determined according to sizes of a slice including the current transformation unit, a maximum coding unit, a coding unit, a prediction unit, etc.

Alternatively, it may be determined by a maximum index of an intra prediction mode how many bits of a symbol bit string are encoded in arithmetic encoding as the prefix bit string through context modeling in the intra prediction mode and how many bits of the symbol bit string are encoded in arithmetic encoding as the suffix bit string in a bypass mode. For example, a total of 34 intra prediction modes may be used for prediction units having sizes of 8×8, 16×16, and 32×32, a total of 17 intra prediction modes may be used for a prediction unit having a size of 4×4, and a total of another number of intra prediction modes may be used for a prediction unit having a size of 64×64. In this case, since the prediction units capable of using the same number of intra prediction modes are regarded as having similar statistical characteristics, a first bit from among bit strings in the intra prediction mode may be encoded through the context modeling for arithmetic encoding with respect to the prediction units having sizes of 8×8, 16×16, and 32×32. Also, all bits from among the bit strings in the intra prediction mode may be encoded in the bypass mode for arithmetic encoding with respect to the rest of the prediction units, that is, the prediction units having sizes of 4×4 and 64×64.

The output unit 130 may output the bit strings generated through the symbol encoding in the form of bitstreams.

Figure 8:
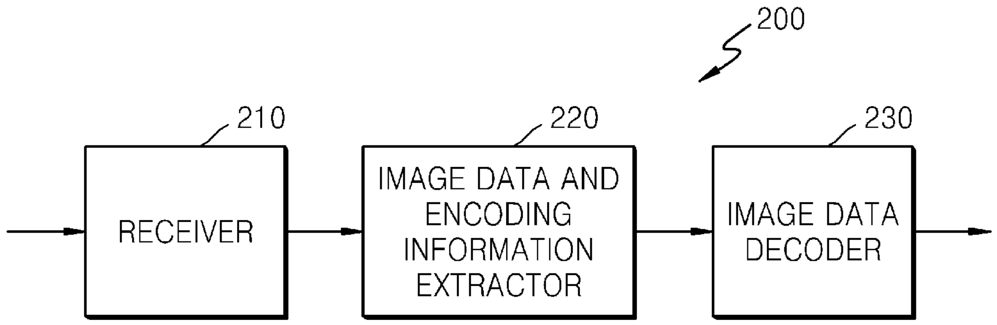
FIG. 8 is a block diagram of a video decoding apparatus based on a coding unit having a tree structure, according to an exemplary embodiment.

FIG. 8 is a block diagram of a video decoding apparatus 200 based on a coding unit having a tree structure, according to an exemplary embodiment.

The video decoding apparatus 200 performing video prediction based on the coding unit having a tree structure includes a receiver 210, an image data and encoding information extractor 220, and an image data decoder 230.

Definitions of various terms, such as a coding unit, a depth, a prediction unit, a transformation unit, and information about various encoding modes, for various operations of the video decoding apparatus 200, may be identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from various sources, for example, a header of the current picture, an SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit string is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deepercoding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the transformation unit according to the coding units having a tree structure, so as to perform the inverse transformation according to maximum coding units. A pixel value of a spatial domain in the coding unit may be restored through the inverse transformation.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the transformation unit size for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. Decoding of the current coding unit may be performed by obtaining information about the encoding mode for each coding unit determined in such a manner.

Also, the video decoding apparatus 200 of FIG. 8 may perform operations of the video decoding apparatus 20 described above with reference to FIG. 2.

The receiver 210 and the image data and encoding information extractor 220 may perform operations of the parser 22 and the symbol decoder 24 of the video decoding apparatus 20. The image data decoder 230 may perform operations of the symbol decoder 24 of the video decoding apparatus 20.

The receiver 210 receives a bitstream of an image, and the image data and encoding information extractor 220 parses symbols of image blocks from the received bitstream.

The image data and encoding information extractor 220 may classify a current symbol into a prefix bit string and a suffix bit string based on a threshold value determined according to a size of a current block. For example, when the final coefficient position information of the transformation coefficient of the transformation unit is decoded, the threshold value for classifying the prefix bit string and the suffix bit string may be determined according to a size (width or height) of the transformation unit. Alternatively, the threshold value may be determined according to sizes of the slice including the current transformation unit, the maximum coding unit, the coding unit, the prediction unit, etc. Alternatively, it may be determined by the maximum index of the intra prediction mode how many bits of the symbol bit string are encoded in arithmetic encoding as the prefix bit string through context modeling in the intra prediction mode and how many bits of the symbol bit string are encoded in arithmetic encoding as the suffix bit string in the bypass mode.

Arithmetic decoding is performed by using an arithmetic decoding method determined for each of the prefix bit string and the suffix bit string of the current symbol. Arithmetic decoding for determining the context modeling according to bit positions may be performed on the prefix bit string, and arithmetic decoding for omitting the context modeling may be performed on the suffix bit string by using the bypass mode.

After the arithmetic decoding, inverse binarization is performed according to a binarization method determined for each of the prefix bit string and the suffix bit string. The prefix region and the suffix region of the symbol may be restored by performing the inverse binarization according to the binarization method determined for each of the prefix bit string and the suffix bit string.

The image data decoder 230 may restore image blocks by performing inverse transformation and prediction on the current block by using the current symbol restored through the arithmetic decoding and the inverse binarization.

Consequently, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 9:
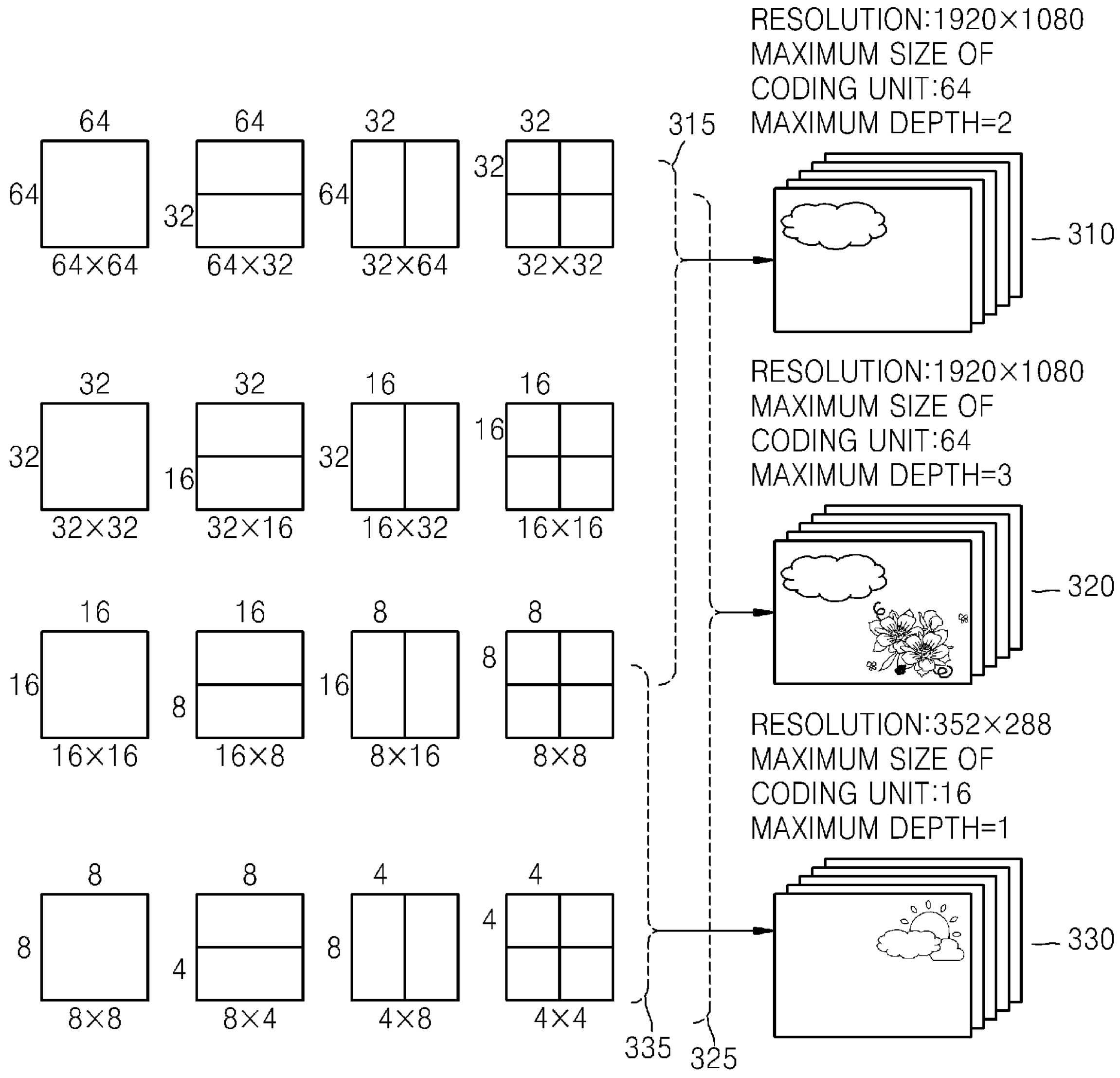
FIG. 9 is a conceptual diagram of coding units, according to an exemplary embodiment.

FIG. 9 is a conceptual diagram of coding units, according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be more precisely expressed.

Figure 10:
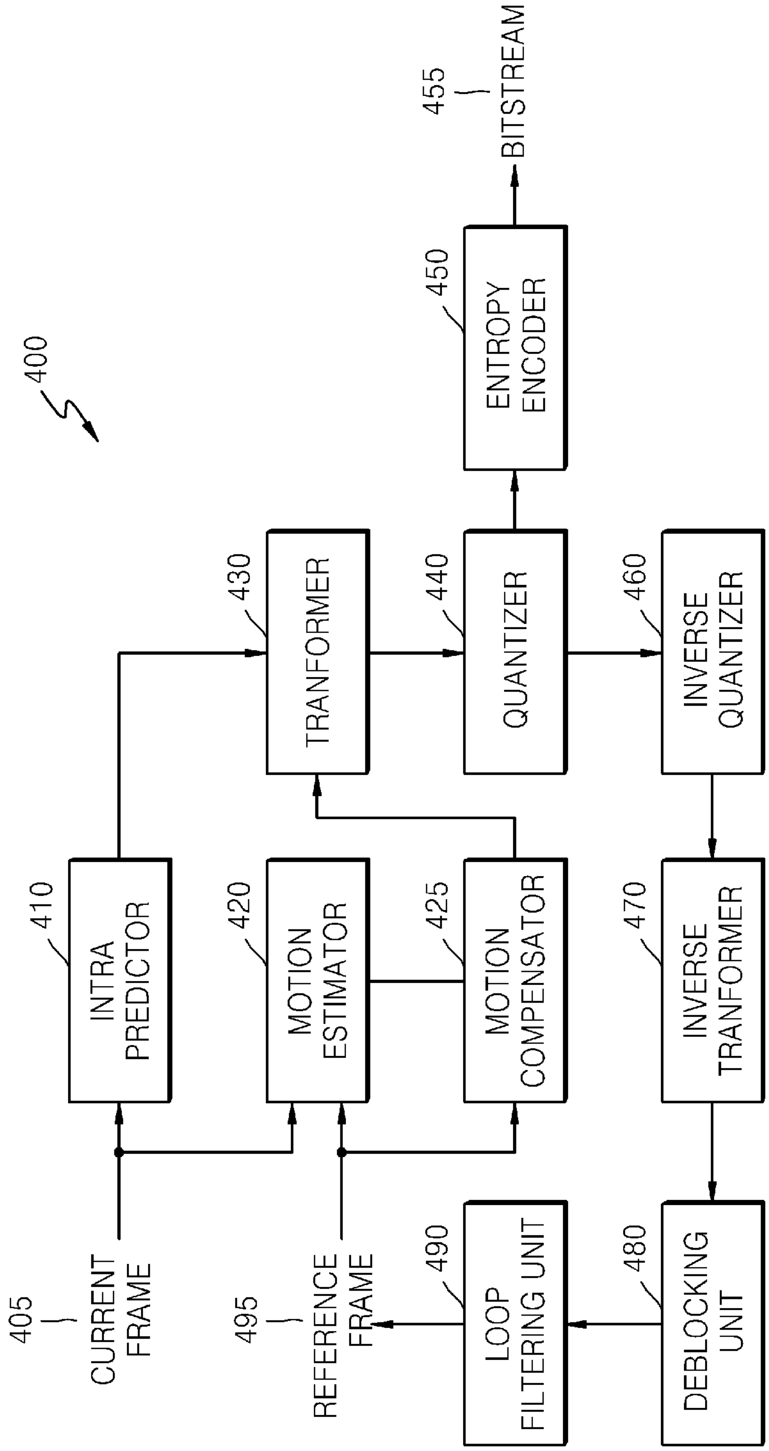
FIG. 10 is a block diagram of an image encoder based on coding units, according to an exemplary embodiment.

FIG. 10 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 (e.g., deblocker) and a loop filtering unit 490 (e.g., loop filter). The quantized transformation coefficient may be output as a bitstream 455 through an entropy encoder 450.

In order for the image encoder 400 to be implemented in the video encoding apparatus 100, each of the elements of the image encoder 400, e.g., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the transformation unit size in each coding unit from among the coding units having a tree structure.

In particular, the entropy encoder 450 may perform symbol encoding on the prefix region and the suffix region by classifying a symbol into the prefix region and the suffix region according to a predetermined threshold value and using different binarization and arithmetic encoding methods with respect to the prefix region and the suffix region.

The threshold value for classifying the symbol into the prefix region and the suffix region may be determined based on sizes of data units of the symbol, for example, a slice, a maximum coding unit, a coding unit, a prediction unit, a transformation unit, etc.

Figure 11:
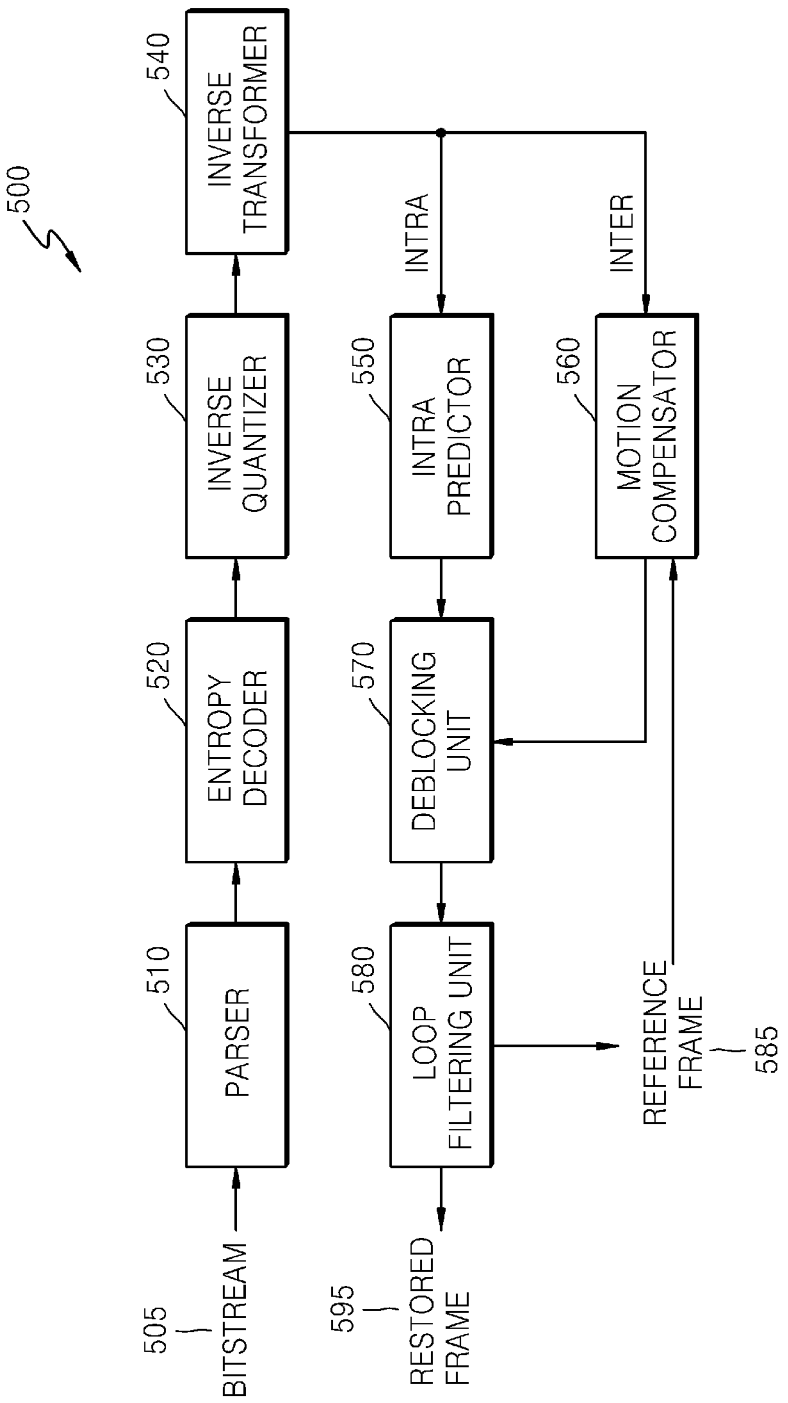
FIG. 11 is a block diagram of an image decoder based on coding units, according to an exemplary embodiment.

FIG. 11 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 (e.g., deblocker) and a loop filtering unit 580 (e.g., loop filter). Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parsing performed by the parser 510.

In order for the image decoder 500 to be implemented in the video decoding apparatus 200, each of the elements of the image decoder 500, e.g., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

In particular, the entropy decoder 520 may perform symbol decoding for each of a prefix bit string and a suffix bit string by classifying the parsed symbol bit string into the prefix bit string and the suffix bit string according to a predetermined threshold value and using different binarization and arithmetic decoding methods with respect to the prefix bit string and the suffix bit string.

The threshold value for classifying the symbol bit string into the prefix bit string and the suffix bit string may be determined based on sizes of data units of the symbol, for example, a slice, a maximum coding unit, a coding unit, a prediction unit, a transformation unit, etc.

Figure 12:
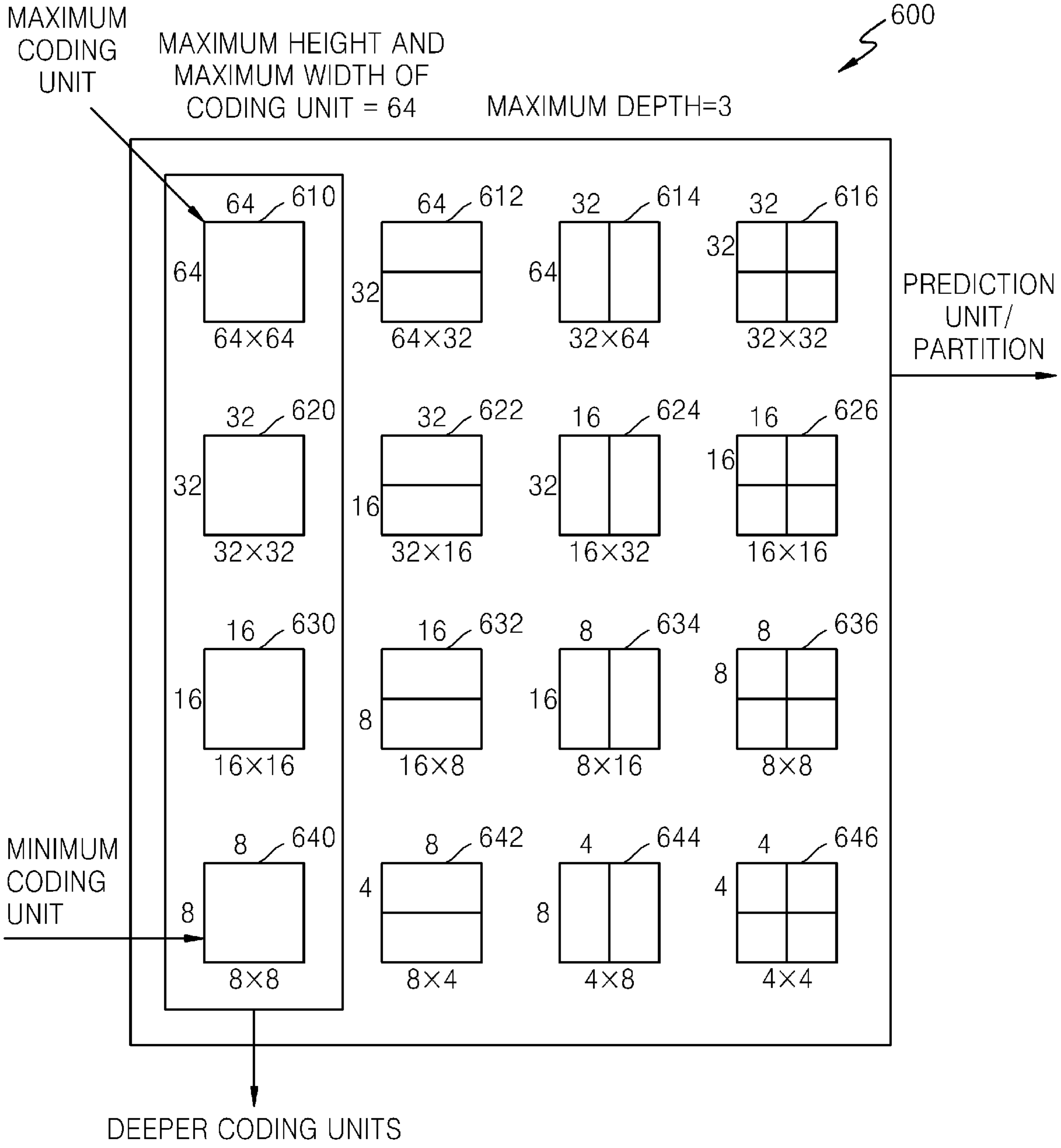
FIG. 12 is a diagram showing coding units according to depths and partitions, according to an exemplary embodiment.

FIG. 12 is a diagram showing deeper coding units according to depths and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. Here, the maximum depth denotes a total number of times splitting is performed from the maximum coding unit to the minimum coding unit. Since a depth deepens along a vertical axis of the hierarchical structure 600, a height and a width of the deeper coding units are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, e.g., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are provided. A coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, e.g., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, e.g., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, e.g., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, e.g., a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units classified according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the smallest encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 13:
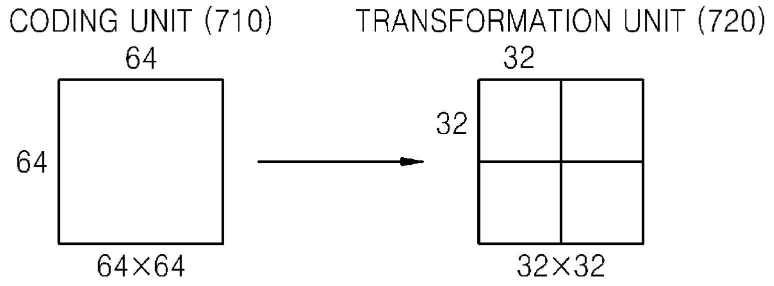
FIG. 13 is a diagram for describing a relationship between a coding unit and transformation units, according to an exemplary embodiment.

FIG. 13 is a diagram for describing a relationship between a coding unit and transformation units, according to an exemplary embodiment.

The video encoding or decoding apparatus (e.g., 100 or 200) encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding or decoding apparatus (e.g., 100 or 200), if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 14:
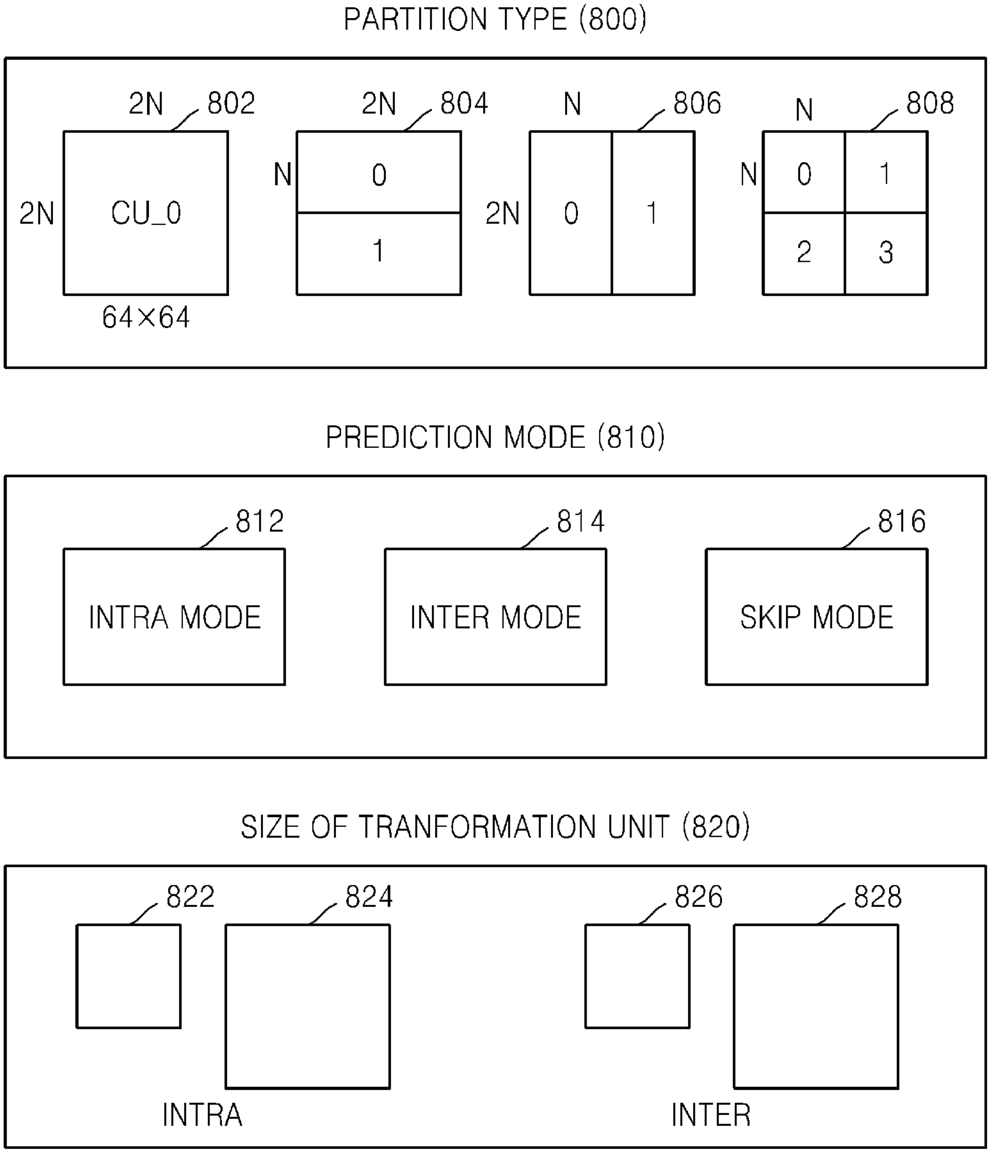
FIG. 14 is a diagram for describing encoding information of coding units according to depths, according to an exemplary embodiment.

FIG. 14 is a diagram for describing encoding information of coding units according to depths, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 15:
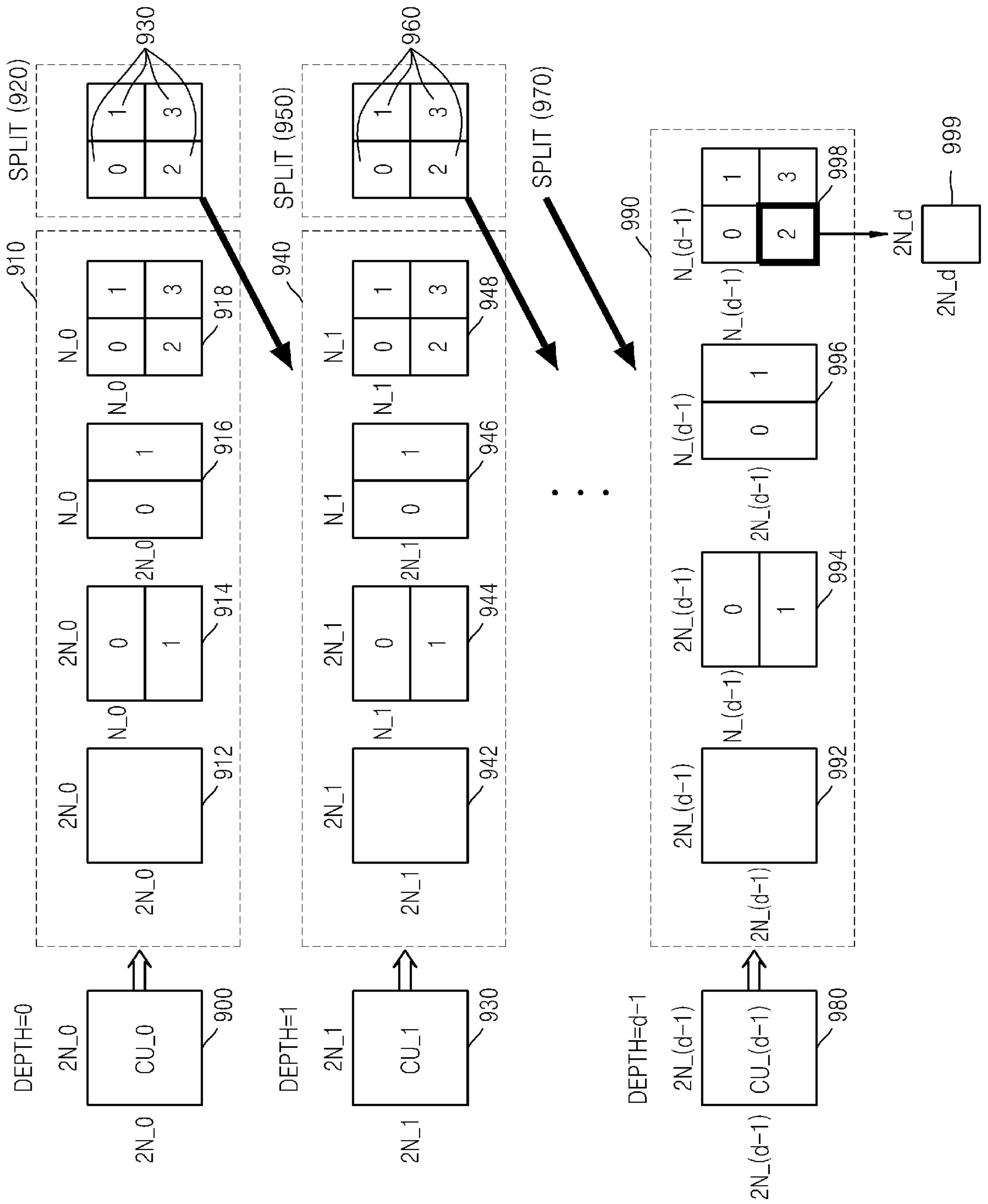
FIG. 15 is a diagram showing coding units according to depths, according to an exemplary embodiment.

FIG. 15 is a diagram showing deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 15 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the minimal encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, the coding unit according to each depth may be performed up to when a depth becomes d−1, and split information may be encoded up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−

1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 16:
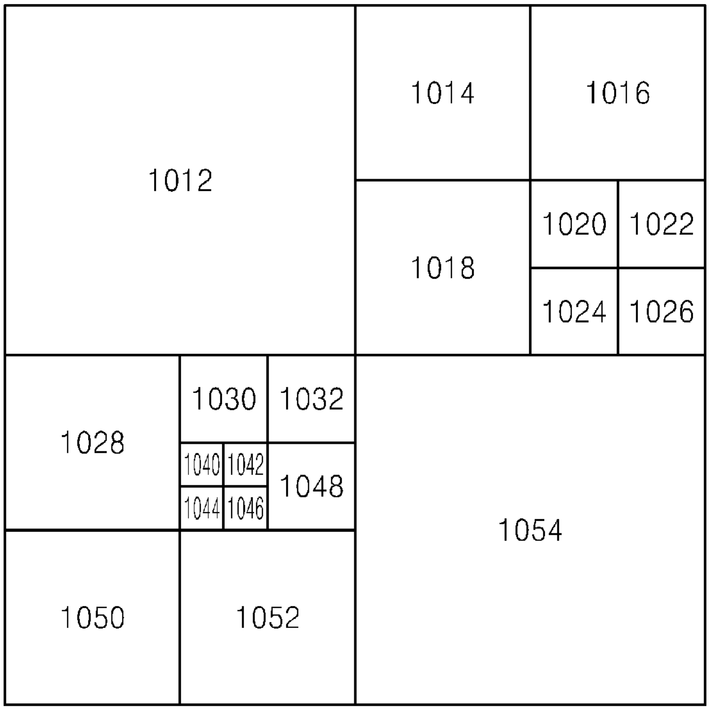
FIGS. 16 to 18 are diagrams for describing a relationship between coding units, prediction units, and transformation units, according to an exemplary embodiment.
Figure 17:
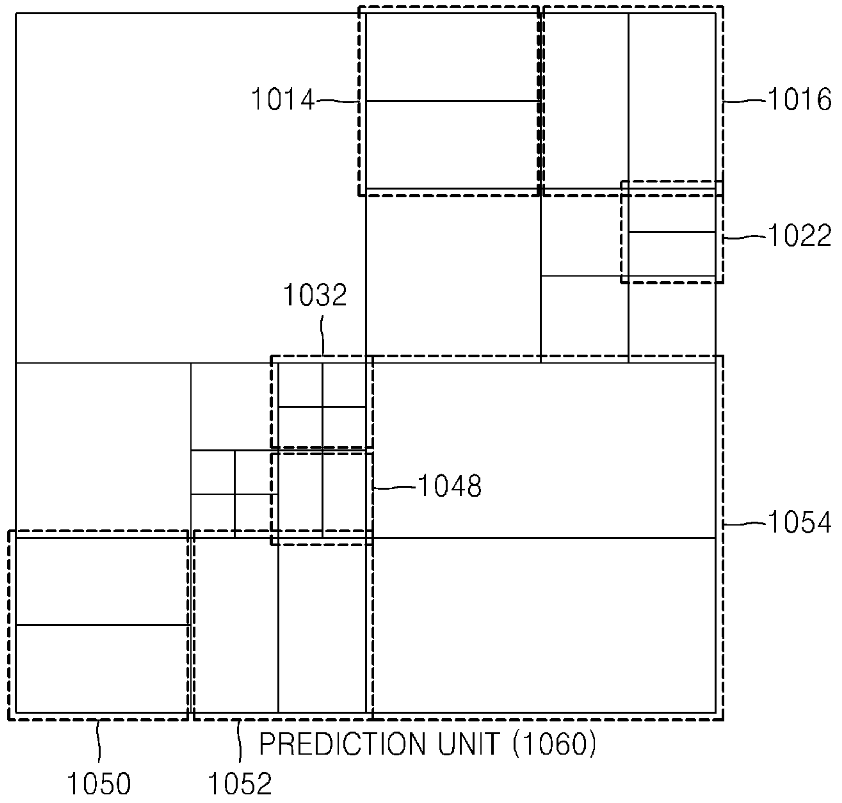
Figure 18:
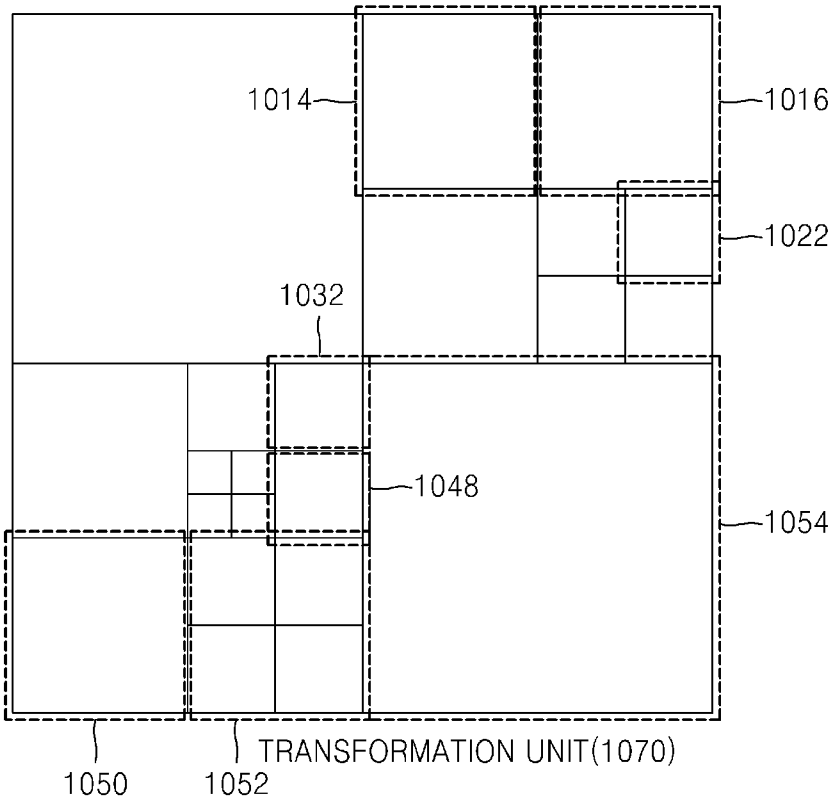

FIGS. 16 to 18 are diagrams for describing a relationship between coding units, prediction units, and transformation units, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | |
| Intra Inter Skip (Only 2N × 2N) | Symmetrical Partition Type | Asymmetrical Partition Type | Split Information 0 of Transformation Unit | Split Information 1 of Transformation Unit | Repeatedly Encode Coding Units having Lower Depth of d + 1 |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The transformation unit size may be set to be two types in the intra mode and two types in the inter mode. In other words, if split information of the transformation unit is 0, the transformation unit size may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the transformation unit size may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 19:
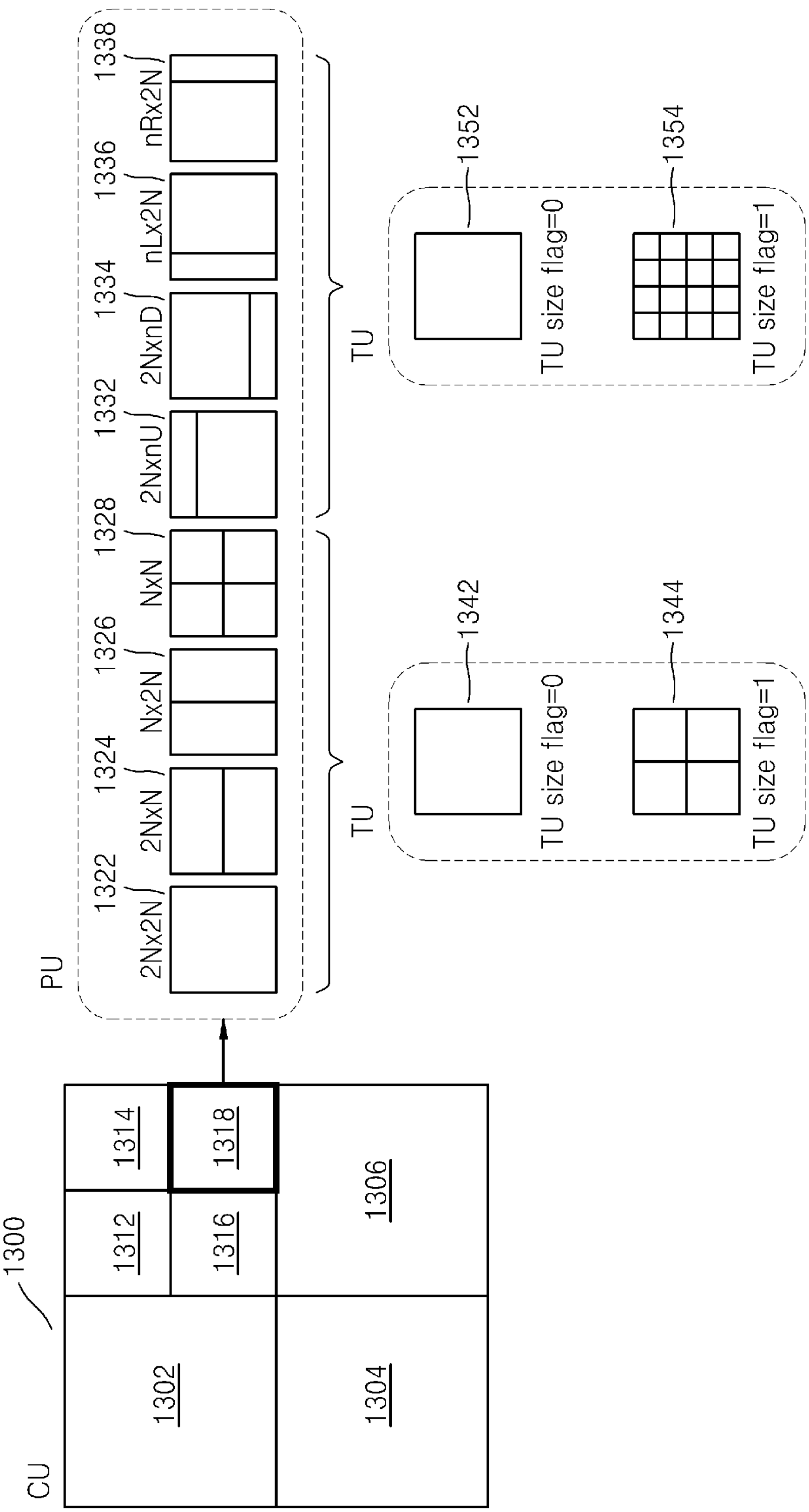
FIG. 19 is a diagram for describing a relationship between a coding unit, a prediction unit, and a transformation unit according to encoding mode information of Table 1.

FIG. 19 is a diagram for describing a relationship between a coding unit, a prediction unit, and a transformation unit according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a kind of a transformation index, and a transformation unit size corresponding to the transformation index may vary according to a type of the prediction unit or the partition of the coding unit.

For example, when the partition type is set to be symmetrical, e.g., the partition type 1322, 1324, 1326, or 1328, a transformation unit 1342 having a size of 2N×2N is set if the split information of the transformation unit is 0, and a transformation unit 1344 having a size of N×N is set if a TU size flag is 1.

When the partition type is set to be asymmetrical, e.g., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value of 0 or 1, but the TU size flag is not limited to 1 bit, and a transformation unit may be hierarchically split having a tree structure while the TU size flag increases from 0. The TU size flag may be used as an exemplary embodiment of the transformation index.

In this case, if split information of the transformation unit is used together with the maximum transformation unit size and the minimum transformation unit size, the transformation unit size that is actually used may be expressed. The video encoding apparatus 100 may encode maximum transformation unit size information, minimum transformation unit size information, and maximum transformation unit split information. The encoded maximum transformation unit size information, minimum transformation unit size information, and maximum transformation unit split information may be inserted into an SPS. The video decoding apparatus 200 may perform video decoding by using the maximum transformation unit size information, the minimum transformation unit size information, and the maximum transformation unit split information.

For example, if a current coding unit has a size of 64×64 and the maximum transformation unit size is 32×32, when the transformation unit split information is 0, a transformation unit size may be set to 32×32, when the transformation unit split information is 1, the transformation unit size may be set to 16×16, and when the transformation unit split information is 2, the transformation unit size may be set to 8×8.

Alternatively, if the current coding unit has a size of 32×32 and the minimum transformation unit size is 32×32, when the transformation unit split information is 1, the transformation unit size may be set to 32×32, and since the transformation unit size is equal to or larger than 32×32, no more transformation unit split information may be set.

Alternatively, if the current coding unit has a size of 64×64 and the maximum transformation unit split information is 1, the transformation unit split information may be set to 0 or 1, and other transformation unit split information may not be set.

Accordingly, if maximum transformation unit split information is defined as 'MaxTransformSizeIndex', if a minimum transformation unit size is defined as 'MinTransformSize', and if a transformation unit size is defined as 'RootTuSize' when the transformation unit split information is 0, 'CurrMinTuSize' which is a minimum transformation unit size available in the current coding unit may be defined by formula (1) below:

$$CurrMinTuSize=max(MinTransformSize,RootTuSize/(2^{\wedge}MaxTransformSizeIndex)) \quad \text{FORMULA 1}$$

Compared to 'CurrMinTuSize' which is the minimum transformation unit size available in the current coding unit, 'RootTuSize' which is a transformation unit size when the transformation unit split information is 0 may represent a maximum transformation unit size that may be adopted in a system. In other words, according to formula (1), 'Root- TuSize/(2^MaxTransformSizeIndex)' is a transformation unit size in which 'RootTuSize' is split a number of times corresponding to the maximum transformation unit split information and 'MinTransformSize' is a minimum transformation unit size, and thus a smaller value from among 'RootTuSize/(2^MaxTransformSizeIndex)' and 'MinTransformSize' may be 'CurrMinTuSize' which is the minimum transformation unit size available in the current coding unit.

The 'RootTuSize' which is the maximum transformation unit size may vary according to a prediction mode.

For example, if a current prediction mode is an inter mode, the 'RootTuSize' may be determined according to formula (2) below. In formula (2), 'MaxTransformSize' denotes a maximum transformation unit size, and 'PUSize' denotes a current prediction unit size.

RootTuSize=min(MaxTransformSize,PUSize) FORMULA 2

In other words, if the current prediction mode is an inter mode, the 'RootTuSize' which is a transformation unit size when the transformation unit split information is 0 may be set to a smaller value from among the maximum transformation unit size and the current prediction unit size.

If a prediction mode of a current partition unit is an intra mode, the 'RootTuSize' may be determined according to formula (3) below. 'PartitionSize' denotes a current partition unit size.

RootTuSize=min(MaxTransformSize,PartitionSize) FORMULA 3

In other words, if the current prediction mode is an intra mode, the 'RootTuSize' may be set to a smaller value from among the maximum transformation unit size and the current partition unit size.

However, the current maximum transformation unit size 'RootTuSize' varying according to a prediction mode of the partition unit is just an example, and a factor for determining the current maximum transformation unit size is not limited thereto.

Image data of a spatial domain is encoded for each coding unit having a tree structure by using a video encoding method based on the coding units having a tree structure described above with reference to FIGS. 7 to 19, and decoding is performed on each maximum coding unit by using a video decoding method based on the coding units having a tree structure, and thus the image data of the spatial domain is restored, thereby restoring a video which is a picture and a picture sequence. The restored video may be reproduced by a reproducing apparatus, may be stored in a storage medium, or may be transmitted via a network.

The exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While the disclosure has been particularly shown and described with reference to exemplary embodiments thereof, it will be understood by those of ordinary skill in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the exemplary embodiments is defined not by the detailed description of the exemplary embodiments but by the appended claims, and all differences within the scope will be construed as being included in the exemplary embodiments.

What is claimed is:

1. An apparatus for decoding a video, the apparatus comprising:

a receiver which is configured to receive a bitstream including information about a last coefficient location of a transformation block;

an arithmetic decoder which is configured to obtain a prefix bitstring of the last coefficient location among the information about the last coefficient location by performing context-based arithmetic decoding on the bitstream, and, when the prefix bitstring is greater than a predetermined value, obtain, from the bitstream, a suffix bitstring according to a bypass mode;

an inverse-binarizer which is configured to perform inverse binarization on the prefix bitstring according to a truncated binarization scheme to obtain an inverse-binarized prefix, and perform inverse binarization on the suffix bitstring according to a fixed-length binarization scheme to obtain an inverse-binarized suffix; and a symbol reconstructor which is configured to reconstruct a symbol indicating the last coefficient location of the transformation block by using the inverse-binarized prefix and the inverse-binarized suffix, wherein a range of a value of the inverse-binarized prefix is determined based on a size of the transformation block and a range of a value of the inverse-binarized suffix is determined based on the value of the inverse-binarized prefix, and wherein a value of the symbol indicating the last coefficient location of the transformation block is reconstructed by using the value of the inverse-binarized prefix and the value of the inverse-binarized suffix.

* * * * *